March 30, 1926.
A. WEILAND
SHOCK ABSORBER
Filed Jan. 10, 1924
1,579,183
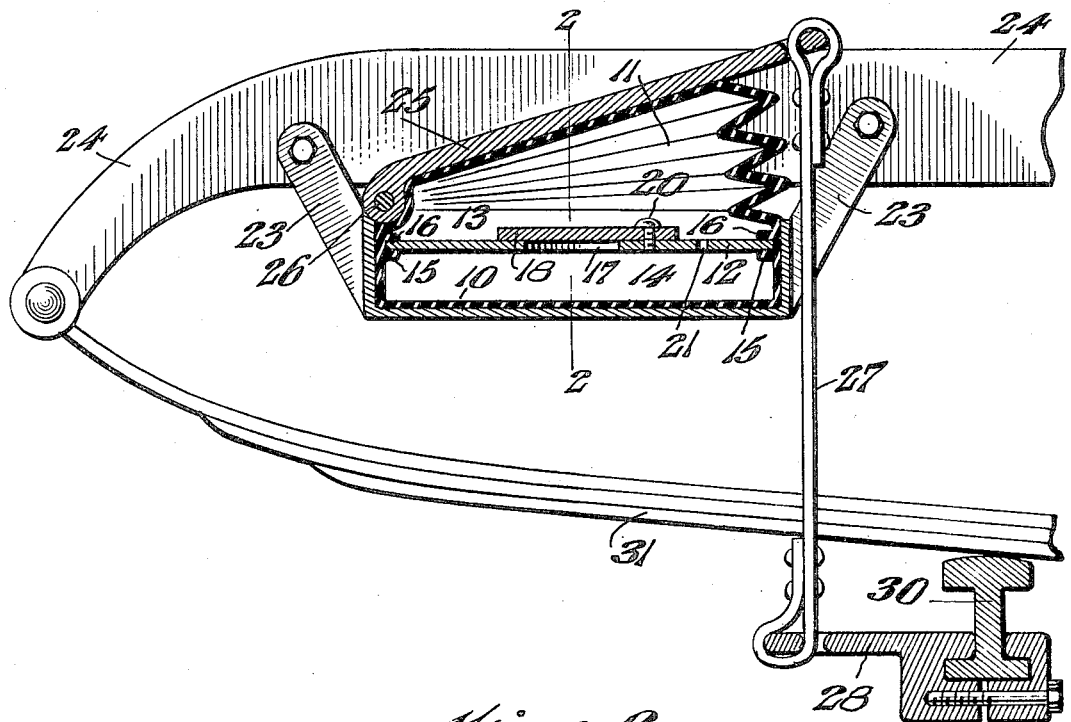
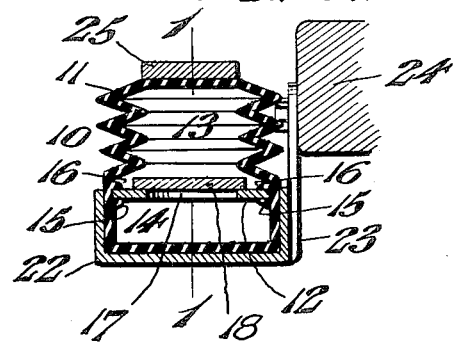
INVENTOR
Alfred Weiland.
BY
Robert M. Barr.
ATTORNEY Patented Mar. 30, 1926.

1,579,183

UNITED STATES PATENT OFFICE.

ALFRED WEILAND, OF EAST ORANGE, NEW JERSEY.

SHOCK ABSORBER.

Application filed January 10, 1924. Serial No. 685,365.

*To all whom it may concern:*

Be it known that I, ALFRED WEILAND, a citizen of the United States, and a resident of East Orange, county of Essex, State of New Jersey, have invented certain new and useful Improvements in Shock Absorbers, of which the following is a specification.

The present invention relates to shock absorbers for vehicles, and has more particular reference to shock absorbers for motor vehicles.

Some of the objects of the present invention are to provide an improved shock absorber for vehicles which functions in conjunction with the vehicle springs to reduce or eliminate shocks or jars caused by inequalities of the road or otherwise; to provide a shock absorber arranged to function in conjunction with the ordinary vehicle spring; to provide a shock absorber so arranged and constructed as to leave a vehicle spring free to receive an impact but which is brought into operation upon the rebound of such spring after the impact; to provide a shock absorbing means arranged to translate an instantaneous, violent, maximum impact into a distributed, gradual, minimum impact; and to provide other improvements as will hereinafter appear.

In the accompanying drawings, Fig. 1 represents a sectional elevation of one form of the present invention shown in operative position upon a vehicle, such as an automobile; and Fig. 2 represents a section on line 2—2 of Fig. 1.

Referring to the drawings, one form of the present invention comprises a shock absorbing means in the form of a closed hollow expansible member 10, of rubber or any other suitable material which may be placed under compression and expanded in the required manner. In the present form, the member 10 is provided with corrugations 11, which extend along two opposite sides of the member and continue across one end thereof, so that the general effect is that of a bellows which may be expanded or compressed along two sides and one end, according to requirements.

For the purpose of controlling the compressive or expansive action of the member 10, it is internally divided by a plate or partition 12 into a main chamber 13 and an auxiliary chamber 14, and in the present instance the plate 12 is supported between two ribs 15 and 16 which are molded integral with the body of the member 10 and extend in parallel relation about the inner wall thereof. Since the member 10 is formed in two parts molded together, it will be evident that the plate 12 can be readily placed in position between the two ribs prior to the molding operation, and after the latter is completed the plate is of course fixed in position.

In order to establish communication between the main chamber 13 and the auxiliary chamber 14, the partition 12 is provided with a relatively large port 17, the opening and closing of which is controlled by a flap valve 18, which is fixed to the partition by a rivet 20 or other suitable fastening means, the arrangement being such that the flap valve opens by pressure exerted from the auxiliary chamber 14 toward the main chamber 13, and closes like a check valve when the pressure is reversed. Thus, under the expansive action of the member 10, the flap valve 18 will automatically open to allow the pressure medium therein to flow quickly and practically unrestricted into the main chamber, while under a compressive action the flap valve 18 will close and prevent the return of such pressure medium by way of the port 17. To allow, however, for this return of the pressure medium to the auxiliary chamber 14, a supplemental port 21 is provided in the plate or partition 12, its size being relatively small as compared to the size of the port 17, and hence the return of the pressure medium from the main chamber to the auxiliary chamber is considerably retarded to produce the desired shock absorbing action.

For supporting the member 10, the lower portion thereof is seated in a suitable casing 22, preferably of metal, which conforms to the shape of the base of the member 10 to be received therein, and generally fits snugly about the lower body of the member 10. This casing 22 is provided with lugs or ears 23, by means of which it is bolted to or otherwise rigidly fastened to the side frame 24 or other fixed part of the vehicle in order to follow the movement thereof under the action of the ordinary vehicle springs. To maintain the member 10 normally under compression and also to allow the necessary expansion due to the movement of the frame 24 when the vehicle springs straighten out, the free end of the member 10 is seated against a rigid plate or strip 25, one end of which is pivoted at 26 to one end of the casing 22, while its opposite end projects beyond the corrugated end of the member 10 and is connected to one end of a flexible retaining strap 27, the opposite end of which is looped about or otherwise pivotally secured to a bracket 28 fast to the axle 30 or other part upon which the vehicle spring 31 rests. The length of the strap 27 is so proportioned as to normally hold the member 10 sufficiently compressed to hold the filling medium under the desired normal pressure. This filling medium is generally air under compression and is pumped into the member 10 to maintain a predetermined working pressure which may be varied to compensate for different weight vehicles or for any other reason.

In the operation of the device the member 10 is filled to the required pressure with the medium, such as air, with which it is to be used, and with the strap 27 fixed to the bracket 28, the member 10 is properly held under compression and ready to serve its purpose. When the vehicle strikes an obstruction in the road, or drops into a hole or rut, the vehicle spring 31, as usual, receives the impact and allows the frame 24 to lower or assume a position closer to the road momentarily, and this action, therefore, allows the holding strip 25 to react upwardly, and thereby permit the member 10 to expand and increase the volume of the main chamber 13. This increase allows the pressure medium from the auxiliary chamber to escape by way of the port 17 past the flap valve 18 into the main chamber 13 so that the pressure in the two chambers are again equalized. When the rebound of the spring 31 takes place, the frame 24 is subject, unless restrained to a violent reaction, but owing to the interposed pneumatic bellows 10 this reaction meets a predetermined opposition because the pressure medium in the main chamber 13 is restricted, in its escape to the auxiliary non-expansible chamber 14, by the small, supplemental port 21. Thus instead of a violent shock being transmitted to the frame 24, the compressive action translates an instantaneous impact of maximum proportions into a distributed gradual impact of minimum proportions.

Having thus described my invention, I claim:

1. A shock absorber comprising an expansible, flexible walled hollow member, means for rigidly securing said member to the frame of a vehicle, means including a rigid hinged member flexibly connected to the axle of the vehicle for maintaining said member under compression and allowing expansion thereof, a partition transverse to the direction of impact dividing said member into two compartments and having two ports for establishing communication between said compartments, one of said ports being uncontrolled, a check valve controlling the other of said ports, and a medium under pressure in said compartments.

2. A shock absorber comprising an expansible, flexible walled hollow member, means for rigidly securing said member to the frame of a vehicle, means including a flexible strap attached to the axle of the vehicle for maintaining said member under compression and allowing expansion thereof, a partition transverse to the direction of impact dividing said member into two compartments and having two ports establishing communication between said compartments, one of said ports being relatively small and uncontrolled, a check valve for the larger port, and a medium under pressure in said compartments.

3. A shock absorber comprising an expansible member provided with corrugations, a casing enclosing a portion of said member, means for rigidly fastening said casing to the frame of a vehicle, a rigid strip pivoted to said casing and arranged to seat on the free end of said expansible member, a flexible connection between said strip and the axle of said vehicle, a medium under pressure in said member, a partition subdividing said member into two compartments and provided with two ports forming a communication between said compartments, and means for closing one of said ports in one direction of flow of said medium.

4. A shock absorber comprising an expansible member provided with corrugations, a casing enclosing a portion of said member, means for rigidly fastening said casing to the frame of a vehicle, a rigid strip pivoted to said casing and arranged to seat on the free end of said expansible member, a flexible connection between said strip and the axle of said vehicle, a partition subdividing said member into two compartments and having a valve controlled port opening in one direction only and an uncontrolled port of relatively smaller area than said valve port, and a medium under pressure in said casing.

5. A shock absorber comprising a pneumatic member, a fixed partition dividing said member transversely of the direction of impact into two chambers having communication by a restricted port and communication by a valve controlled port arranged to permit relatively free flow of the pressure medium in one direction, means for rigidly connecting one end of said member to a vehicle frame, and means controlled by the action of a vehicle spring for holding said member under compression and varying the holding pressure.

6. A shock absorber comprising a pneumatic member, a fixed partition dividing said member transversely of the direction of impact into two chambers having communication by a restricted port and communication by a valve controlled port arranged to permit relatively free flow of the pressure medium in one direction, means for rigidly connecting said member to a vehicle frame, and means including a flexible strap controlled by the action of a vehicle spring for holding said member under compression and varying the holding pressure.

7. A shock absorber comprising a pneumatic member, a fixed partition dividing said member transversely of the direction of impact into two chambers having communication by a restricted port and communication by a valve controlled port arranged to permit relatively free flow of the pressure medium in one direction, means for rigidly connecting said member to a vehicle frame, and means including a pivoted strip controlled by the action of a vehicle spring for holding said member under compression and varying the holding pressure.

8. A shock absorber comprising an expansible hollow member, means for rigidly securing one end of said member to the frame of a vehicle, a movable part arranged to seat against the other end of said member, means movable with a vehicle for holding said movable part in position to place said expansible member under compression, a partition dividing said member into two compartments, and means for causing relatively free flow of said medium from one compartment to the other when said spring expands and for causing restricted flow when said spring contracts.

9. A shock absorber comprising an open top housing rigidly secured to a vehicle frame, an expansible hollow member seated in said housing and having a portion projecting through said open top having corrugated walls, a partition dividing said member into upper and lower compartments, said partition having a valve controlled port and a normally open restricted port, a strip pivoted to said housing, and a strap member connecting said strip to the vehicle spring parts and holding said strip in contact with said hollow member.

Signed at New Brunswick, in the county of Middlesex, State of New Jersey, this 2nd day of January, 1924.

ALFRED WEILAND.